US009445302B2

(12) United States Patent
Vos et al.

(10) Patent No.: US 9,445,302 B2
(45) Date of Patent: *Sep. 13, 2016

(54) METHOD AND SYSTEM FOR WIRELESS COMMUNICATION WITH MACHINE-TO-MACHINE DEVICES

(71) Applicant: Sierra Wireless, Inc., Richmond (CA)

(72) Inventors: Gustav Gerald Vos, Surrey (CA); Nicolas Damour, Toulouse (FR); David Anthony Clark, Vancouver (CA); Sebastien Launay, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 28 days.

This patent is subject to a terminal disclaimer.

(21) Appl. No.: 14/106,601

(22) Filed: Dec. 13, 2013

(65) Prior Publication Data

US 2014/0105009 A1 Apr. 17, 2014

Related U.S. Application Data

(63) Continuation-in-part of application No. 13/918,303, filed on Jun. 14, 2013.

(60) Provisional application No. 61/659,838, filed on Jun. 14, 2012.

(51) Int. Cl.
*H04W 48/06* (2009.01)
*H04W 28/02* (2009.01)
(Continued)

(52) U.S. Cl.
CPC ...... *H04W 28/0268* (2013.01); *H04L 47/2433* (2013.01); *H04L 47/2475* (2013.01); *H04W 4/005* (2013.01); *H04W 28/0215* (2013.01); *H04W 74/00* (2013.01)

(58) Field of Classification Search
CPC ............ H04W 28/0268; H04W 28/0215; H04W 4/005; H04W 74/00; H04L 47/2475; H04L 47/2433
See application file for complete search history.

(56) References Cited

U.S. PATENT DOCUMENTS 6,778,833 B1  8/2004 Fortuna
7,269,146 B2  9/2007 Pecen et al.
(Continued)

FOREIGN PATENT DOCUMENTS

CA  2626110 A1  4/2007
GB  2484342 A   4/2012
(Continued)

OTHER PUBLICATIONS

United States Patent and Trademark Office ("USPTO") Office Action dated May 7, 2015, for related U.S. Appl. No. 13/628,588. (U.S. Publication No. 2013/0083717).
(Continued)

*Primary Examiner* — Jay P Patel
(74) *Attorney, Agent, or Firm* — Mintz Levin Cohn Ferris Glovsky and Popeo, P.C.

(57) ABSTRACT

Approaches for managing machine-to-machine (M2M) wireless devices are disclosed. M2M wireless devices may be configured to utilize service classes in order to implement network access policy control. Packets generated by an application running on the wireless device are inspected, for example using Deep Packet Inspection (DPI). Service class may be assigned based on patent contents such as payload, transport-layer criteria, or communication protocol in use. Service class assignment proceeds according to a rule set which may be remotely configurable. Packets may be buffered and their transmission may be deferred pending service class assignment. Spoofing of the intended recipient and/or the application may be performed while the packets are buffered and/or inspected.

18 Claims, 10 Drawing Sheets

(51) Int. Cl.
*H04W 4/00* (2009.01)
*H04L 12/859* (2013.01)
*H04L 12/851* (2013.01)
*H04W 74/00* (2009.01)

(56) References Cited

U.S. PATENT DOCUMENTS

| | | | |
|---|---|---|---|
| 7,426,203 | B1 | 9/2008 | McNamara et al. |
| 7,626,962 | B1 | 12/2009 | Zhang et al. |
| 7,738,421 | B2 | 6/2010 | McNamara et al. |
| 7,864,729 | B2 | 1/2011 | Zhang et al. |
| 7,965,682 | B2 | 6/2011 | McNamara et al. |
| 2001/0034753 | A1 | 10/2001 | Hildebrand et al. |
| 2004/0198279 | A1 | 10/2004 | Anttila et al. |
| 2005/0083961 | A1 | 4/2005 | Pecen et al. |
| 2006/0248578 | A1 | 11/2006 | Denton |
| 2007/0220279 | A1 | 9/2007 | Northcutt et al. |
| 2008/0020763 | A1 | 1/2008 | Fischer |
| 2008/0102749 | A1 | 5/2008 | Becker |
| 2010/0017463 | A1 | 1/2010 | Horn et al. |
| 2010/0062723 | A1 | 3/2010 | Tao et al. |
| 2011/0081883 | A1 | 4/2011 | Daly |
| 2011/0128911 | A1 | 6/2011 | Shaheen |
| 2011/0151898 | A1 | 6/2011 | Chandra et al. |
| 2011/0171923 | A1 | 7/2011 | Daly et al. |
| 2011/0201365 | A1 | 8/2011 | Segura |
| 2011/0274040 | A1 | 11/2011 | Pani et al. |
| 2012/0004003 | A1 | 1/2012 | Shaheen et al. |
| 2012/0030358 | A1 | 2/2012 | MacKenzie |
| 2012/0106391 | A1 | 5/2012 | van Loon et al. |
| 2012/0140677 | A1 | 6/2012 | Choi et al. |
| 2013/0083717 | A1 | 4/2013 | Vos et al. |
| 2013/0122906 | A1* | 5/2013 | Klatt ............... H04W 48/02 455/435.1 |
| 2013/0315074 | A1 | 11/2013 | Kim et al. |
| 2013/0336111 | A1 | 12/2013 | Vos et al. |
| 2014/0098671 | A1* | 4/2014 | Raleigh ............ H04M 15/80 370/235 |
| 2014/0314043 | A1 | 10/2014 | Kim et al. |
| 2014/0341109 | A1 | 11/2014 | Cartmell et al. |

FOREIGN PATENT DOCUMENTS

| WO | WO-2011/152665 A2 | 12/2011 |
|---|---|---|
| WO | WO-2013/044387 A1 | 4/2013 |
| WO | WO-2013/185240 A1 | 12/2013 |

OTHER PUBLICATIONS

"One2many Introduces Machine-to-Machine Cell Broadcast". *Business Wire*. Business Wire. Mar. 20, 2013. Web. Accessed Aug. 6, 2013.

"What is a Cell Broadcast." *Cell Broadcast Forum*. Web. Accessed Aug. 22, 2013.

3GPP. TS 23.041 v11.0.0 Dec. 2010. Technical Specification. "3rd Generational Partnership Project; Technical Specification Group Core Network and Terminals; Technical realization of Cell Broadcast Service (CBS) (Release 11)." Dec. 2010.

Cell Broadcast System Factsheet "Muslim Prayer Service." Apr. 7, 2008.

Cell Broadcast System Factsheet "The SMS CB Function in Mobile Networks." Apr. 22, 2008.

Cell Broadcast System Whitepaper "Discovering CB Services." Dec. 8, 2010.

Cell Broadcast System Whitepaper "Displaying CB Messages." Mar. 15, 2011.

Cell Broadcast System Whitepaper "Languages in EU-Alert." Dec. 10, 2010.

Cell Broadcast System Whitepaper "Managing CB messages." Sep. 2, 2010.

Cell Broadcast System Whitepaper "Support of languages." Dec. 21, 2010.

ETSI TS 123 038 v.10.0.0 (Mar. 2011). "Alphabets and language-specific information" (3GPP TS 23.038 version 10.0.0 Release 10) Mar. 2011.

ETSI TS 123 041 v 10.0.0 (Apr. 2011). "Technical Realization of Cell Broadcast Service (CBS)" (3GPP TS 23.041 version 10.1.0 Release 10) Apr. 2011.

ETSI TS 123 042 v.10.0.0 (Mar. 2011). "Compression algorithm for text messaging services" (3GPP TS 23.042 version 10.0.0 Release 10) Mar. 2011.

ETSI TS 148 049 v 10.0.0 (Apr. 2011). "Cell Broadcast Service Protocol (CBSP)" (3GPP TS 48.049 version 10.0.0 Release 10) Apr. 2011.

International Search Report and Written Opinion mailed Dec. 14, 2012, for related International Application No. PCT/CA2012/050677.

International Search Report and Written Opinion mailed Oct. 15, 2013, for related International Application No. PCT/CA2013/050458.

Supplementary European Search Report dated Feb. 12, 2015, for a related European Patent Application No. 12835534.4.

United States Patent and Trademark Office ("USPTO") Office Action dated May 15, 2014, for U.S. Appl. No. 13/628,588 (U.S. Publication No. 2013/0083717).

United States Patent and Trademark Office ("USPTO") Office Action dated Oct. 21, 2014, for U.S. Appl. No. 13/628,588 (U.S. Publication No. 2013/0083717).

Extended European Search Report dated Dec. 8, 2015, for related EP Patent Application No. 13804148.8.

Notice of Allowance dated Sep. 11, 2015, for related U.S. Appl. No. 13/628,588.

* cited by examiner

100

105 Configuration or Control Message at Server

110 Use Broadcast, Unicast, or Both? → Unicast → Execute Unicast Procedure

Broadcast / Both ↓

115 Generate and Configure Broadcast Message

120 Forward Broadcast Message for Transmission by Network

125 Receive Broadcast Message at M2M Devices

127 M2M Devices analyze address in Message Header

130 Intended Recipient M2M devices Process Configuration or Control Message

135 M2M Devices Transmit Acknowledgments (after Random Time Delay)

FIGURE 1

METHOD AND SYSTEM FOR WIRELESS COMMUNICATION WITH MACHINE-TO-MACHINE DEVICES

CROSS-REFERENCE TO RELATED APPLICATIONS

This application is a continuation-in-part of U.S. application Ser. No. 13/918,303, filed Jun. 14, 2013 and issued as U.S. Pat. No. 9,380,130 Jun. 28, 2016, which in turn claims the benefit and priority of U.S. Provisional Application 61/659,838, filed Jun. 14, 2012. The foregoing applications are incorporated by reference herein in their entirety.

FIELD OF THE TECHNOLOGY

The present technology pertains in general to wireless communication messaging and in particular to wireless communication with machine-to-machine devices.

BACKGROUND

Machine-to-Machine (M2M) devices are expected to be added to wireless networks in large numbers over the next few years. Their patterns of operation are typically different from the phones, smartphones and personal computing devices that currently dominate in terms of their proportion of use of the wireless networks. Many of the M2M terminals will operate for short periods of time, sending small amounts of data infrequently. Some will remain in one fixed location. In order to save power, M2M terminals may not be continuously registered on the network, which means that they may not be reachable by direct calling. In many cases however they will be listening to the base station and should be able to receive broadcast messages.

Different applications running on M2M wireless devices may have different requirements. For example time-sensitive information may require a higher Quality of Service (QoS) treatment than non-time-sensitive information. Security may be required for some applications but not others. However, implementation of such differential service is not always straightforward, and improvements to such implementations would be beneficial.

Therefore there is a need for a method and apparatus for wireless communication with machine-to-machine devices that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and system for wireless communication with machine-to-machine devices. In accordance with an aspect of the present technology, there is provided a method for managing access to a wireless network by a wireless device, the method comprising: accessing a set of network access rules for potential use in governing network access operations performed by the wireless device; accessing a set of service classes, wherein each service class is associated with a particular subset of the set of network access rules; upon receiving a request by an application running on the wireless device for accessing the wireless network, determining a service class associated with the application, and accessing the network in accordance with the determined service class and the subset of network access rules associated with the determined service class, wherein determining the service class comprises inspecting data packets transmitted by the application and allocating the service class based on contents of said data packets in accordance with a rule set.

In accordance with another aspect of the present technology, there is provided a wireless device comprising: a memory comprising a set of network access rules for potential use in governing network access operations performed by the M2M wireless device, and a set of service classes, wherein each service class is associated with a particular subset of the set of network access rules; and a network access module configured to: receive a request by an application running on the M2M wireless device for accessing the wireless network; determine a service class associated with the application; and access the network in accordance with the determined service class and the subset of network access rules associated with the determined service class, wherein determining the service class comprises inspecting data packets transmitted by the application and allocating the service class based on contents of said data packets in accordance with a rule set.

In accordance with another aspect of the present technology, there is provided a non-transitory computer program product configured for managing access to a wireless network by a wireless device, the computer program product comprising code which, when loaded into memory and executed on an associated processor, is adapted to perform: accessing a set of network access rules for potential use in governing network access operations performed by the wireless device; accessing a set of service classes, wherein each service class is associated with a particular subset of the set of network access rules; upon receiving a request by an application running on the wireless device for accessing the wireless network, determining a service class associated with the application, and accessing the network in accordance with the determined service class and the subset of network access rules associated with the determined service class, wherein determining the service class comprises inspecting data packets transmitted by the application and allocating the service class based on contents of said data packets in accordance with a rule set.

BRIEF DESCRIPTION OF THE FIGURES

These and other features of the present technology will become more apparent in the following detailed description in which reference is made to the appended drawings.

FIG. 1 illustrates a method for managing machine-to-machine (M2M) wireless devices, in accordance with embodiments of the present technology.

DETAILED DESCRIPTION OF THE TECHNOLOGY

Definitions

Figure 2:
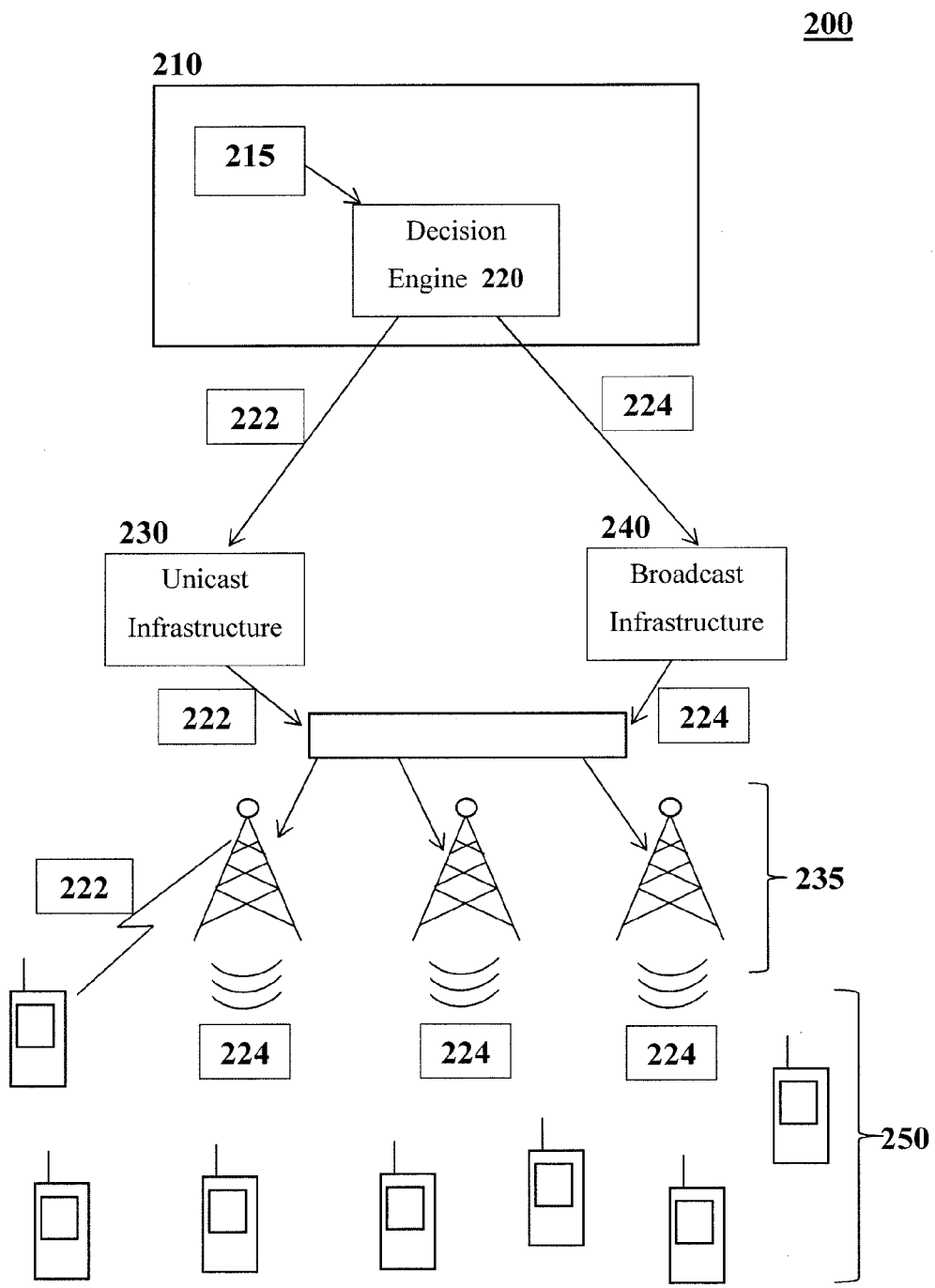
FIG. 2 illustrates a system for managing machine-to-machine (M2M) wireless devices, in accordance with embodiments of the present technology.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Embodiments of the present technology provide a means for controlling communication behaviours of M2M devices. One mechanism provided in accordance with the present technology relates to particular configurations of M2M device behaviours for desirable traffic management, and the like. In particular, M2M device behaviours may be modified dynamically based on contents of the data to be transmitted by these devices. Each M2M device may inspect contents of packets generated by applications running on the M2M device, and assign service classes for use in transmitting the packets based on the inspection. In some embodiments, the M2M device behaviours may, when appropriate, be configured via broadcast device management, in which potentially multiple M2M devices are configured and/or controlled via a broadcast channel such as the Cell Broadcast channel. The M2M devices may be configured for appropriate interoperation with the broadcast channel. In various embodiments, an M2M device comprises a wireless modem and at least one application, such as an original equipment manufacturer (OEM) application.

Embodiments of the present technology are applied to facilitate secure and efficient machine-to-machine (M2M) communication. M2M communication may comprise automated communication between one or more relatively autonomous devices. For example, one or more remote metering or monitoring devices may periodically or intermittently transmit data, such as telemetry data, to a receiver, such as a server. The server may also periodically or intermittently transmit data, such as requests or updates, to the remote devices. M2M communication may be used to manage remote devices in a wide array of applications, as would be readily understood by a worker skilled in the art.

An M2M device may be connected to one or more servers, such as application servers, at least in part via a wireless network. Wireless networks may include cellular networks which may also be configured to service mobile phones, for example. Examples of such networks include GSM, UMTS and LTE networks, as well as related data transmission technologies such as EDGE and GPRS and the like as would be readily understood.

Network infrastructure may include air interfaces, cellular base stations, node B's, radio network controllers, base station controllers, gateways, SGSNs, GGSNs, cell broadcast centres, and the like. In some embodiments, the network infrastructure facilitates communication without necessarily requiring customization in accordance with the present technology. In other embodiments, the network infrastructure may be configured to execute various functions specific to the present technology.

FIG. 1 illustrates a method 100 provided in accordance with an embodiment of the present technology. A server generates or receives 105 a configuration or control message for communication to one or more groups of M2M devices. The server then determines 110 whether to transmit the message via broadcast, unicast, or a combination thereof. Unicast messages may be transmitted in accordance with existing methods, for example. If at least one broadcast message is to be transmitted, then the message is generated and configured 115. The configured broadcast message is then forwarded 120 for transmission over a broadcast channel. For example, the message may be sent as one or more packets for wireless transmission via a short message service-cell broadcast (SMS-CB) system associated with a cellular network. Various M2M devices receive 125 the broadcast message and analyze 127 the header to determine if the message is intended for them, for example by examining a group address field. Intended recipient M2M devices then process 130 the message and may transmit an acknowledgement 135 if configured to do so. Processing the message may comprise reconfiguration of the M2M device according to the configuration message, for example. In some embodiments, the broadcast message may be repeated two or more times, either unconditionally or conditional upon the number of acknowledgements received.

As used herein, a group of devices refers to a collection of devices such as M2M devices. In various embodiments, services may be conducted on a group, such as sending device triggers to all devices in a group, sending application data to all devices in a group, assigning monitoring policies to the devices in a group, and assigning network access policies to the devices in a group. Groups may be identified by a group address, for example. An M2M device may belong to one group or multiple groups.

Embodiments of the present technology provide a system comprising a server and a plurality of machine-to-machine (M2M) wireless devices. The server is communicatively coupled to the plurality of M2M devices at least in part via a broadcast wireless communication link. The M2M devices are configured, controlled, or configured and controlled via the broadcast wireless communication link.

FIG. 2 illustrates a system 200 provided in accordance with embodiments of the present technology. The system comprises a server 210, such as an application server, with a message 215 to transmit to a group of M2M devices. As would be readily understood the server can be a single computing device or a collection of computing devices providing the desired functionality. The message may be a policy change message, for example. The server 210 comprises a decision engine 220 for determining whether to transmit the message via broadcast, unicast, or a combination thereof. Unicast messages 222 may be transmitted via existing unicast infrastructure 230, protocols and message delivery media. Unicast protocols and message delivery media may comprise open mobile alliance-device management (OMA-DM) protocols, IP packets, SMS messages, and the like. Unicast infrastructure may comprise OMA-DM infrastructure, SMS infrastructure, GPRS infrastructure, EDGE infrastructure, and the like. Broadcast messages 224 may be transmitted via broadcast infrastructure 240, a broadcast device management protocol, SMS-CB messages, and the like. Unicast and broadcast messages 222, 224 are transmitted wirelessly to M2M devices 250 via one or more base stations 235.

Broadcast Device Management

Broadcast device management relates in general to a means by which potentially large numbers of M2M devices may be configured and/or controlled from a source such as a base station or M2M server by utilizing broadcast channels to transmit configuration and/or control messages. In some embodiments, broadcast device management may be related to the transport layer of a standard protocol stack. Use of broadcast messages may avoid or alleviate the need for a large number of unicast messages addressed to individual devices, thereby providing for more efficient use of network resources. Broadcast device management may be used, in part, to configure wireless device behaviours such as how service classes are assigned to application data flows based on the inspection of packet contents.

Broadcast device management may make use of an existing Cell Broadcast Service (SMS-CB) which is part of the standards for 2 G, 3 G and 4 G wireless networks. For example, for SMS-CB in 2 G a defined and pre-allocated part of the base station transmissions is intended to be receivable by all suitably programmed mobile receivers.

Embodiments of the present technology may leverage and/or interoperate with various features of SMS-CB, such as those defined in the following technical standards from the Third Generation Partnership Project (3GPP): 3GPP TS 23.041 "Technical Realization of Cell Broadcast Service"; 3GPP 48.049 "Base Station Controller—Cell Broadcast Centre (BSC-CBC) interface specification; Cell Broadcast Service Protocol (CBSP)"; 3GPP TS 23.038 "Alphabets and language-specific information"; and 3GPP TS 23.042 "Compression algorithm for text messaging services," each of which is incorporated herein by reference. For example, SMS-CB or Cell Broadcast Service may provide various mechanisms facilitating reliable, error-free message transport.

In some embodiments, broadcast messages may be used for one or more of: group M2M device triggering; transmission of application messages to groups of M2M devices; updating of network load rules; changing of application data stream identifiers; changing of service classes for a particular application, and the like. An M2M application may provide an application data stream name to the M2M network access control layer when requesting access to the network. The network access control layer maps the application data stream to a service class and/or a set of service class identifiers, for example by name. The mapping may be defined in the portal or server and dictated to M2M devices via broadcast transmission. In some instances, plural application data streams may be mapped to the same service class. A device may support multiple applications with different application data streams and stream names.

In some embodiments, duplicate application data stream names are not permitted. In some embodiments, an M2M device contains a single table mapping application data stream names to service classes. The table may also contain an element used to define the default service classes, to be used when the application data stream name sent by the M2M application to the network access control layer is not found in the table. In embodiments, if a default service class is not set and the application data stream name is not in the table, and no default service classes are defined, only rules associated with a global default service class will apply. For example, the first element in the table may be used to hold the global default service class identifier. The table may be stored in a list node.

According to embodiments, wireless devices may use different levels of security, for example as defined by their current service class. Different security levels may include: no security; message encryption; message authentication; and message encryption plus message authentication. When encryption is used, different security levels may correspond to different levels or strengths of encryption. When authentication is used, different security levels may correspond to different levels of authentication. A message authentication code may be used within a header to provide protection against eavesdropping, man in the middle attacks, and replay attacks, for example.

M2M Network Access Control

M2M network access control may relate to a control plane mechanism that controls access to network resources, for example related to one or both of the signaling plane and the user plane, by a related M2M application. Policies may be established to govern access, and these policies may be set up using existing, legacy unicast device management transport mechanisms (e.g. OMA-DM, communication via IP or SMS, or the like) or using broadcast device management over a broadcast channel, such as a Cell Broadcast channel. Using broadcast device management for establishing and configuring policies and/or for general configuration of M2M network access control, or using a combination of unicast and broadcast device management, may be more efficient in various situations. M2M network access control may operate at least in part as a built-in functionality or agent of an M2M device. M2M network access control may operate at least in part as a built-in functionality or agent of a remote server or application running thereon. M2M network access control may operate as a functionality split between the M2M device and a remote server or application. In some embodiments, M2M network access control may be provided as a separate but interactive functionality from broadcast device management.

In some embodiments, M2M network access control comprises one or more of: setting or managing network access rules, including traffic load spreading controls; changing or managing data stream names or service class identifiers of an M2M application; assigning or managing network access policies to groups of devices; triggering a device to start a device management session, and/or other functionalities. A network access policy is a set of network access rules governing the conditions under which an application is permitted to access the network. A network access policy may define a set of one or more service classes and associated attributes. A service class may be regarded as a QoS service level. Each network access rule may be associated with one or more service classes. Different network access rules may be defined for different service classes within a group. In some embodiments, M2M network access control may be configured to indicate to M2M terminals the levels of network congestion. Multiple service levels may be supported for all network access control services.

In some embodiments, M2M network access control may be configured to determine whether to use unicast or broadcast messaging to reach target M2M devices, for example based on a consideration of efficient use of network resources. This functionality may be enabled by a decision engine operating on a remote server, for example. This functionality may use data regarding the locations of target M2M devices and the probabilities that the location data is current and correct.

For example, in the case where a message is to be sent to multiple M2M devices, and the message may be sent either by contacting the M2M devices individually by unicast (e.g. by point-to-point SMS message or IP packet), or by broadcast message (e.g. by SMS-CB broadcast), embodiments of the present technology are configured to identify opportunities to replace plural unicast messages with a single broadcast message, and to capitalize on such opportunities if they are cost-effective. In some cases, the message may be sent via plural broadcast messages, or via a combination of unicast and broadcast messages.

The decision may comprise computing the cost associated with different messaging options, where the cost may be a monetary cost, or another pre-defined cost function. The cost function may account for various aspects, such as network resource usage, network delays, monetary charges incurred, reliability, and the like.

For example, when determining whether to message k M2M devices via k separate unicast messages or via a single broadcast message, the unicast cost may be calculated as k times (a+b+c) where a represents a delay cost, b represents a triggering cost, such as an SMS triggering cost, and c represents a data cost. The delay cost a is included since M2M devices may be offline and thus unreachable via unicast for long periods of time to conserve network resources, so large delays may potentially be incurred. In contrast, some types of broadcast messages, such as SMS-CB, may be receivable by an M2M device even when it is offline, thus the delay may be considerably less. The broadcast cost may be calculated as d*e+f, where d represents the cost of transmitting a broadcast message page, e represents the number of message pages required to communicate the message, and f represents a reliability cost associated with the broadcast method. Other formulas and/or criteria for carrying out cost/benefit comparisons of unicast vs. broadcast options may be used. In some embodiments, QoS and/or security considerations may be taken into account. For example, unicast may be preferred if higher security is desired. As another example, if acknowledgements are required from M2M devices, unicast may be used to control timing of acknowledgements, by controlling timing of the unicast messages wherein receipt of the unicast message influences when the acknowledgement is transmitted, for example by specifying that acknowledgements are to be transmitted immediately upon message receipt.

Figure 3:
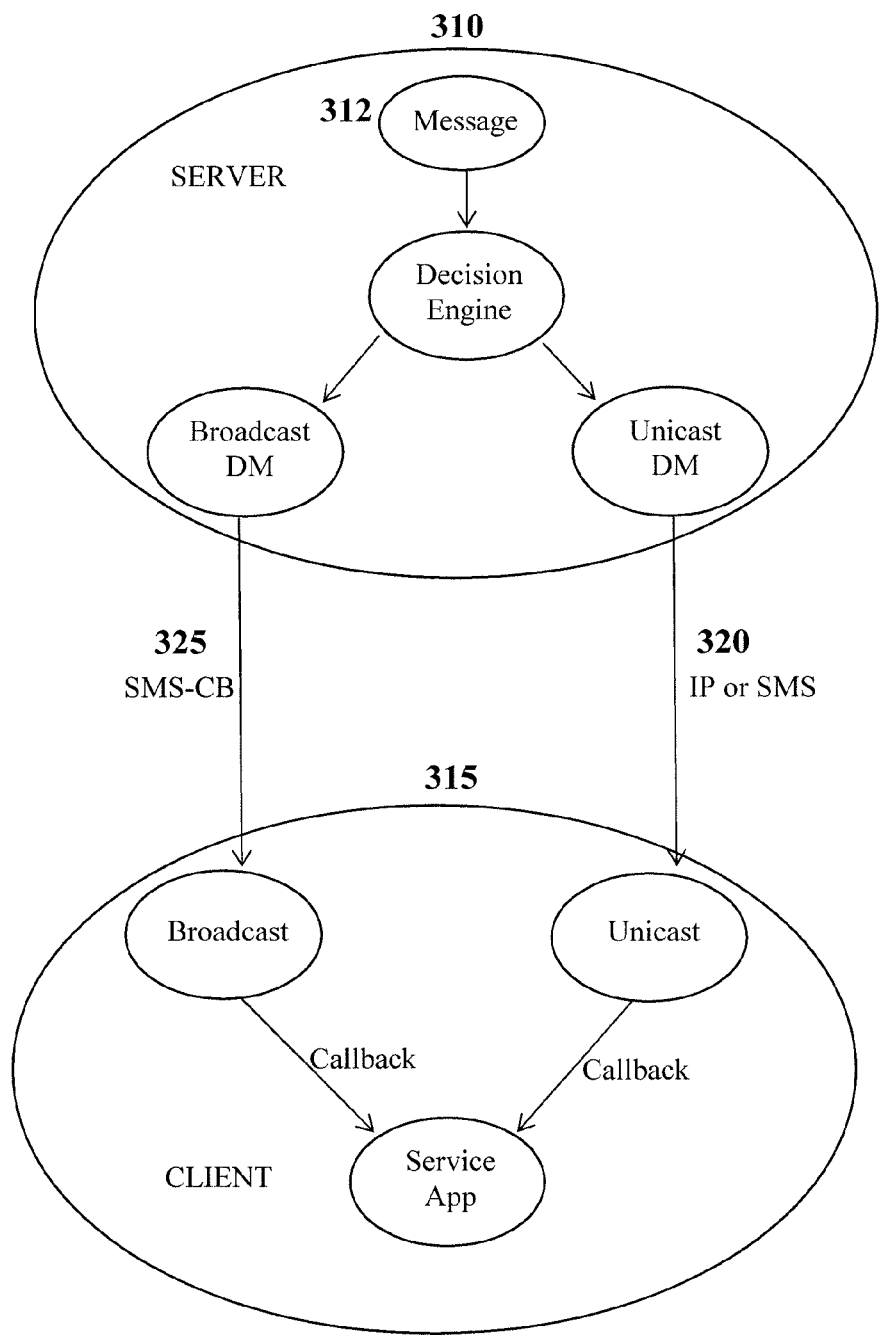
FIG. 3 illustrates aspects of interaction between a server and a client M2M device, in accordance with embodiments of the present technology.

FIG. 3 illustrates a server 310 such as an application server with a message 312, such as a device management message, intended for a client M2M device 315. The server 310 may be wirelessly communicatively coupled to the client 315 via a unicast channel 320 or a broadcast channel 325. The unicast channel may use IP communication over wireless, SMS, or the like. The broadcast channel may use SMS-CB or other suitable method as would be readily understood. The server 310 is configured to determine which of the two channels 320, 325 to use for transmission of the message 312, and to initiate transmission using a selected channel. The client 315 is configured to receive and process the message. In some embodiments, the client may receive and initially process messages received over the unicast channel 320 via a different mechanism than messages received over the broadcast channel 325, although further processing may be performed by a common mechanism. The different mechanisms may be operatively coupled to the common mechanism via use of callback functions. As would be readily understood the noted server can be a single computing device or a collection of computing devices provided the desired functionality.

In some embodiments, network access control comprises defining network access rules which dictate when and/or how a designated M2M device is to access network resources. This may be referred to as uplink network access control. Each network access rule may be implemented as a conditional, e.g. "if then" statement, mapping one or a combination of conditions to an action. The combination of conditions may be a Boolean combination, for example. Conditions may include: time of day (ToD), network congestion level (Cong), and network event limitations (NE). Network access rules may further be specific to a service class identifier and/or application data stream identifier. Actions may include: restricting network access; allowing network access; sending an alert to a portal; resetting the M2M modem; limiting download data rates; limiting upload data rates; and changing the current service class. Network access rules may also relate to and/or affect security, QoS, priority, or the like. Network access rules may be updated via broadcast or unicast message from a portal or server.

In some embodiments, network events are events which use network resources in the wireless network. Network events may comprise packet data protocol (PDP) context events such as PDP activations, mobility management events, device attach events, upload and/or download data usage events (such as data usage metrics relative to a predetermined level or data usage occurring), SMS usage events (such as SMS transmission or reception events, or SMS usage metrics relative to a predetermined level), circuit switched registrations, circuit switched voice minutes, radio resource control (RRC) state transitions, user-generated events, and network load estimate events. Example events include: monthly attach time for an M2M device being greater than 1 hour, greater than 50 attaches per month for an M2M device, greater than 5 attaches per 10 minutes for an M2M device, and greater than 10 KB downloaded per day for an M2M device. Network access rules may be re-evaluated upon occurrence of each network event.

In some embodiments, network access rules are configured having hysteresis, for example such that the conditions for inhibiting access when access is currently allowed differ from the conditions for allowing access when access is currently inhibited. This may be used to avoid oscillating effects at marginal network conditions.

In some embodiments, each network access rule is associated with a random back-off time range. After the end of a period of restricted access in which pending transmissions may build up, the M2M devices are configured to wait a random amount of time within the back-off time range, to avoid traffic peaks. Random time delays for transmitting messages after a period of restricted access may be implemented similarly to random time delays for transmitting acknowledgements, as described elsewhere herein. For example each M2M device may generate a random time delay independently, but based on a random backoff parameter such as a time interval or probability distribution which influences generation of the random time delay. The ending of the period of restricted access may be indicated by transmission of a broadcast message indicative that network access is allowed following a period in which network access had been denied. Optionally the broadcast message may specify the random backoff parameter.

In some embodiments, if two network access rules are evaluated where one allows access and one restricts access, the restriction rule takes precedence. In further embodiments, this setting may be configurable. In some embodiments, if no rule exists for a particular ToD, then by default network access is allowed.

In some embodiments, generating a randomized time delay, whether for transmission following a period of restricted access or for transmission of acknowledgements, may comprise setting a backoff timer with a random value. Once the backoff timer expires the M2M device transmits its message. Randomization may be used in conjunction with other scheduling methods. For example, different subgroups of M2M devices may be assigned different time intervals during which transmission of acknowledgements and/or transmission of other messages is authorized. By defining different time intervals for different subgroups, transmission may be spread in time in order to avoid traffic peaks. Each M2M device within a subgroup may randomize its transmission time within its defined interval.

In some embodiments, the backoff timer may be temporarily suspended when network access is restricted. For example, if ToD, Cong or NE components of the network access rule change such that access is suspended while the backoff timer is counting down, the backoff timer may be suspended. When access is re-allowed, the backoff timer may then continue, rather than computing a new backoff timer value. Furthermore, if access is restricted after timer timeout but before the network can be accessed, the device may be allowed to access the network immediately upon access re-allowance. In some embodiments, the backoff timer may be reset after a predetermined long period of access restriction.

In some embodiments, network access rules may be specified as being applicable to one or more radio access technologies. Radio access technologies may include 1xRTT, EVDO, GSM, UMTS, HSPA, LTE, Wi-Fi™ and the like.

In some embodiments, ToD conditions may be used to set the time(s) of day and optionally day(s) of week or day(s) of month at which network access is allowed. This may facilitate spreading network access for various devices or groups so as to control potential congestion. Time may be local time or universal time. For example, ToD conditions may specify that network access is allowed every 15 minutes for 5 minutes, one week of every month, only on weekends, weekdays between 7 pm and 9 pm, and the like. ToD conditions may be combined with other conditions, including other ToD conditions, using Boolean logic, to define when network access is allowed. ToD conditions may be different from device to device and/or from group to group.

In some embodiments, broadcast messaging, such as via SMS-CB, may be used to facilitate multi-level congestion control in relation to network access control. This is an example of device management via broadcast messaging as described elsewhere herein.

In some embodiments, an M2M device may be configured to restrict network access based on congestion levels in the network. For example, if network congestion is above a predetermined threshold, the M2M device will not transmit certain messages. Congestion levels may be evaluated and/or controlled at a remote server, at an intermediate device coupled to the network, at the M2M device, or at a combination of the above. Congestion indicating and/or control messages may be broadcast to plural M2M terminals, for example according to group address. Congestion may be evaluated for the entire wireless network or for various portions thereof. Since congestion can occur at different layers in the system, different entities at different layers may independently define congestion criteria for network access rules. The different entities at different layers may further be configured to independently broadcast congestion level information to be used by network access rules. Each M2M device may be configured to estimate congestion levels, in absence of or to augment broadcast congestion level information.

In some embodiments, when a network access rule is associated with a long time range in which an M2M device is enabled to access the network, a random time may be selected before access is allowed. The random time may be selected according to parameters, such as minimum and maximum times or probability function parameters. The parameters may be particular to a group of M2M devices, a service class, or the like, or a combination thereof.

In some embodiments, each M2M device, service class, or group may be configured with a predetermined maximum delay time. If the M2M device has a pending message and the maximum delay time has expired, the message can be transmitted regardless of at least some other network access rules which may be in effect. In some embodiments, the message is transmitted immediately upon expiry of the maximum delay time. In some embodiments, the message is transmitted at the earliest opportunity after expiry of the maximum delay time, subject to one or more sufficiently high-priority network access rules.

In some embodiments, when an M2M device or application running thereon makes a request for network access, and a service class or application data stream identifier is not specified in the request, a default set of network access rules may be applied. Alternatively, a service class may be assigned based on packet contents as described elsewhere herein. The default set of network access rules may be those associated with a default service class, which may be specified by a server and communicated to various M2M devices. If multiple default service classes are specified, default network access rules may be defined as those associated with all of the specified default service classes.

In some embodiments, an override service class may be available for use. The override service class may provide a mechanism by which certain network access rules are always applied regardless of conditions that might otherwise specify different network access rules as applicable. For example, if an invalid service class identifier or application data stream identifier is provided by an M2M device or application, the override service class may be used to override the default network access rules. In some embodiments, the override service class may be reserved on an M2M portal on the network side. Network access rules that belong to the override service class may be applied always, regardless of what the M2M terminal service class identifier would otherwise determine.

In some embodiments, an application data stream identifier is used to map application data streams to service classes and/or applicable sets of network access rules. This creates a level of indirection which may be used to facilitate development, support, implementation of legacy applications, and the like. For example, M2M application developers may specify an application data stream identifier and delegate the implementation of service classes and network access rules to another person, who does not have to modify the application but assigns an association between the application data stream identifier and a set of select service classes and/or network access rules. Assigned associations may be stored in a look-up table, for example. Changes to service classes associated with the M2M application may also be implemented by updating the look-up table, rather than modifying the M2M application.

In some embodiments, a service class identifier is assigned to each device. Each device may have a substantially unique service class identifier, although uniqueness may not be strictly required. In some embodiments, devices may initially have a unique service class identifier, which can be later changed to a unique or non-unique value. In some embodiments, uniqueness is managed by the portal.

In some embodiments, when making a request for network access to the network access control layer, an M2M application is configured to specify which rules apply by specifying the service class identifier. Each group and/or network access policy can define a set of service classes. If desired, policies can "share" a service class. This allows policies to build upon other lower layer policies. When a service class is shared the same service class identifier may be used.

According to embodiments, the portal can set three attributes per SC: the maximum delay, the spreading delay range, and whether the SC is a default SC.

In some embodiments, an M2M device may be triggered from an off-line state. That is, the M2M device may enter an off-line state but still be receptive to broadcast messages such as SMS-CB messages. Thus, a broadcast trigger may be issued to such devices. In some embodiments, the M2M device may inform a server of its location before going off-line, thus allowing the broadcast trigger to be transmitted in the appropriate region.

Service Class Assignment Based on Packet Contents

An aspect of the present invention relates to managing access to a wireless network by a wireless device such as a machine-to-machine (M2M) wireless device, also referred to herein as network control. A set of network access rules and a set of service classes may be defined for potential use by the M2M wireless device. These network access rules and service classes may be pre-defined, stored at the wireless device, and may be updated via broadcast or unicast messages transmitted to the wireless device. The network access rules, when invoked, govern network access operations, such as uplink communications, performed by the wireless device. The service classes are associated with a particular subset of the set of network access rules. A service class, when invoked, may cause its associated subset of network access rules to likewise be invoked, thereby governing network access operations in accordance with the network access rules of the service class.

In accordance with embodiments of the present invention, network access operations made by applications running on the wireless device may be processed as follows. Processing may be performed, for example, by a network access module of the wireless device through which the network access operations are routed. A service class associated with the network access operation and/or underlying application is determined, and network access is then performed in accordance with the determined service class and, by extension, the subset of network access rules associated with the determined service class.

In some embodiments, the network access operations may comprise sending one or more data packets from the application, which are then further processed, for example by the network access module which intercepts the packets or through which the packets are routed.

Processing of the network access operations and/or associated packets generally comprises assigning a service class thereto. In various embodiments, deep packet inspection (DPI) may be used to process the packet data corresponding to the network access operations. DPI may comprise analyzing packet contents in order to determine a service class for assignment. In this case, a service class may be assigned even if the application does not specify one. In some embodiments, once a service class is assigned, it may be applied to all packets of the same application until further notice. In some embodiments, service class assignments may apply to subsequent packets from the same application but expire after a predetermined number of packets or a predetermined time. Thus, for example, service classes may be assigned to legacy applications and application programming may be streamlined by separating the service class definition functionality from the application. For example, applications may not need to be adapted to use or incorporate APIs for specifying which service class they require. DPI may be used to categorize packets, sockets, or the like, in to different service classes. This may facilitate different treatment, for example so that QoS levels and/or different security levels may be applied differentially.

More generally, an aspect of the present invention comprises receiving, from an application operating on a wireless device, packets for transmission by the wireless device, classifying the packets by the wireless device before transmission, and transmitting the packets in accordance with their classification. Classification may be performed via DPI, for example.

In various embodiments, when an application does not specify a service class for use, assignment of a service class based on DPI may be used as an alternative to assignment of a default service class. Service class assignment based on DPI may be performed in accordance with a rule set, which may optionally be updated as required via broadcast or unicast message from a portal or server.

In various embodiments, the service class assignment rule set may be based on transport-layer, link layer or application layer criteria, on the nature of the protocol or protocols in use, content of protocol headers within the packet, packet payload, or the like, or a combination thereof. Transport-layer criteria may depend on communication protocols in use and may include items such as USSD message, MO SMS bearer, SMS destination number, IP PDN connection, destination IP address, destination port number, and the like. The nature of the protocol or protocols in use may correspond, for example, to broadcast device management message protocol (BDMP) in an SMS message, IP TCP or UDP, CoAP, HTTP, XMPP, NTP, OMADM, OMA Lightweight Device Management, AWTDA, LWM2M, or the like.

In various embodiments, DPI is performed at the wireless device, for example by a network access module which receives data packets generated by applications running on the wireless device and which forwards packets for wireless transmission by the wireless device. Since the wireless device is only required to perform DPI on its own packets, processing load may be manageable locally, rather than requiring an external device to perform DPI on packets from several wireless devices.

In various embodiments, as mentioned above, the rule set for service class assignment based on DPI may be remotely configurable via broadcast or unicast messages from a portal or server. Keyword criteria, logical operations for classifying packets based on their contents, ordering of operations, precedence of operations, and the like may be specified as part of the rule set. This may facilitate updating of the manner in which mobile devices treat packets for transmission, for example in terms of the QoS, security, priority, or other aspects of treatment.

In some embodiments, packets generated by an application running on the wireless device are buffered. Buffering comprises storing application packet contents for further processing, such as DPI. In some embodiments, buffering may also comprise or be associated with generating responses for transmission back to the application, for example in order to prompt the application to transmit further data for use in DPI classification and/or in order to maintain a connection made by the application, for example by avoiding timeout events.

In some embodiments, connect operations are buffered by the network access module or by an associated connection buffering module. This may include buffering connection requests outgoing from the wireless device, for example as generated by specified applications running on the device.

In some embodiments, buffering of connect operations may also comprise responding to the application's send call from within the wireless device. For example, for a TCP connection, the first Over-The-Air (OTA) operation may generally be to connect with a remote entity, for example by sending a SYNC message. However, since there may be insufficient information at this time to determine the appropriate service class for treating these connection request messages, establishing the connection for servicing the appropriate application and in the appropriate way may be problematic. Buffering is therefore performed in which signals, such as but not necessarily limited to handshaking signals, are transmitted from a buffering function within the wireless device back to the originating application in order to spoof connection. That is, the buffering function communicates with the application in the same general way that the intended recipient of the connection request is expected to have communicated, thus it appears to the application that the connection with the remote entity has been made. Additionally, the packets transmitted by the application are stored by the buffering function. DPI is performed on the packets transmitted by the application in order to determine an appropriate service class. Once a service class is determined, the stored packets are transmitted as required to the remote entity in order to truly establish the connection. Transmission is performed in accordance with the network access rules corresponding with the determined service class.

In some embodiments, send call operations are buffered by the network access module or by an associated send call buffering module. Send call operations may correspond to socket send calls as would be readily understood by a worker skilled in the art, for example related to operations from and/or to a socket once in a connected state, and where user plane data may be present. Send call operations may originate from an application running on the wireless device and may also be buffered on the wireless device. Buffering may be performed to accumulate sufficient information in the user plane data for DPI analysis in order to determine an appropriate service class. For example, often the first socket send call only contains header information such as HTTP header data. By buffering the send call and associated user plane data for plural send call messages, data can be accumulated for more reliable analysis.

In various embodiments, when buffering send calls, the buffering function may be configured to spoof signalling back to the application so that it appears that the send calls were received successfully at their endpoint. That is, the buffering function communicates with the application in the same general way that the intended recipient of the send call is expected to have communicated, thus it appears to the application that the remote entity has received the appropriate data. Additionally, the packets transmitted by the application are stored by the buffering function. Once a service class is determined, the stored packets are transmitted as required to the remote entity. Transmission is performed in accordance with the network access rules corresponding with the determined service class.

In various embodiments, in accordance with the above, data may be buffered, for example for send calls and/or connection requests, until the appropriate service class is determined from the buffered data, until a buffer memory limit has been reached, or otherwise until communication with a remote entity addressed by the buffered packets is required. Once such communication is required, a default or best-guess service class may be applied and the data transmitted. Alternatively, in some embodiments, if it determined that it is not required to send some of the buffered data on to the desired endpoint, then this portion of buffered data can be overwritten in order to continue buffering and analysis in order to determine an appropriate service class.

In some embodiments, incoming packets are buffered as follows. The start of a packet is detected and the buffer responds by acquiring and holding the packet contents as the header and following data is inspected. If the packet is longer than the limited buffer size, then not all of the packet is held in the buffer, but rather select portions of the packet are held, for example the first part of the packet. A maximum time or size cut-off may be set for holding contents in the buffer. For example if the buffer size is 512 bytes then the maximum amount of packet data to be stored may be limited to less than or equal to 512 bytes.

In some embodiments, a mechanism may be provided for sensing the end of a packet to be held in the buffer. For example, if the buffer is 512 bytes but a packet received into the buffer is less than 512 bytes long, for example 256 bytes long, then the present invention may be configured to infer that the current transmission has ended. For example, the present invention may infer that the current transmission has ended based on detection of a pause of predetermined length in transmission of data into the buffer, for example a pause of one second. At this point, a stale socket may be assumed. Additionally, it may be assumed at this point that the application is awaiting an acknowledgement of the current transmission. An acknowledgement may, in various cases, be spoofed, solicited and/or received from the intended recipient of the packet. In some embodiments, the present invention may further be configured to monitor activity of the application which sent the packet in order to infer whether the current transmission has ended. For example, the application's read access operations to an associated TCP port number via which packets are expected to be received for the application may be monitored. If the application performs an operation to read or monitor the TCP port, it may be assumed that the application has completed its current transmission and, for example, is awaiting an acknowledgement such as a TCP ACK packet or other response. Once it has been inferred that transmission is complete, the present invention may expect, at least temporarily, to not receive further packets from the application at the buffer.

In some embodiments, DNS queries are blocked in order to prevent access to OTA resources. For example, in an initial access operation the application or UE may send an outbound DNS enquiry. Embodiments of the present invention may intercept this DNS enquiry and block it from being wirelessly transmitted based on a rule. The DNS query may be generated at the wireless device and also intercepted and blocked at the wireless device. In some embodiments, all DNS queries may be blocked. In some embodiments, some IP addresses corresponding to domain names may be stored locally, and DNS queries may be analyzed to determine if they are querying a domain name for which an IP address is already stored locally. Such DNS queries may be blocked from wireless transmission, and instead the locally stored IP address may be returned. In some embodiments, a DNS function spoofs the DNS server in order to return the locally stored and requested IP address to the application. Such embodiments may address a potential requirement to have the wireless device and/or applications running on the wireless device conform to certain network access rules put in place to limit and shape wireless traffic.

In various embodiments, DPI functions are configured to analyze packet data for specific predefined patterns. Such patterns may be determined locally or determined remotely and specified to the DPI function via wireless communication. Patterns may correspond to certain text data, destination addresses such as IP addresses, port numbers, socket identifiers, protocol identifiers, commands, queries, application identifiers, and the like.

For example, for a predetermined pattern length, such as 10 bytes, a sliding correlation may be performed between the start and end of a packet under analysis. Each 10 byte window of packet data may be analyzed to determine whether the data matches a predetermined pattern being sought. Based on patterns found, a service class may be selected.

In some embodiments, predefined patterns to be identified via DPI correspond to text strings, each associated with certain prioritized actions, categorizations, or priority levels. For example the text string "alarm" may be a search pattern which is assigned a higher priority than the text string "temperature." If the text string "alarm" is found in a packet, then that packet may be associated with a higher QoS service class than a packet containing the text string "temperature." Patterns are not limited to text strings, but may also correspond to other elements of a packet such as IP address, port number, protocol type, socket identifier, and the like. In some embodiments, special code phrases may be defined which map to predetermined service classes, and which may be used by an application to explicitly request a service class, for example "useSC5" may be interpreted as a specific request to implement a service class with identity number 5.

In some embodiments, the DPI function is configured to perform a predetermined decision process which takes as its input the patterns found (if any) in the packet data and returns a service class level to apply to the packet or packets. The decision process may map various found patterns and/or combinations of found patterns, such as keywords or key data, to various service classes. The decision process may be predefined, locally configured, or remotely configured. A remotely configured decision process may be defined and/or updated via wireless communication. Updates may be transmitted to each wireless device individually or to groups of wireless devices, for example via use of broadcast device management messages.

Socket to SC Message

In some embodiments, certain messages may be used to request a particular service class for a data stream without necessarily having to modify the M2M application involved. This may be useful for applications which are not inherently configured to take advantage of various service classes, such as legacy applications. In some such embodiments, socket parameters and searching of message content may be used to influence which service class is associated with certain data. In some embodiments, this may be performed via user data rather than by the application itself.

In various embodiments, a table may be stored at the wireless device for mapping sockets to service classes. The table may encode DPI rules to implement, a list of identified protocols, IP addresses, port numbers, and the like, and optionally rules for associating such data with particular service classes.

In some embodiments, the table may be stored in a predetermined list node, and may include at least some of the following entries: version number, number of DPI rule entries, and a list of these DPI rules. Each DPI rule may specify: data length, data, a starting data position, an ending data position, a protocol, one or more specified protocols associated with the rule, such as ICMP, TCP and UDP, a list of IP addresses associated with the rule, potentially including wildcard characters such as "*" or "?", a list of port numbers, and a list of service classes. Thus, the DPI rules may assign service classes based on data such as protocols, IP addresses, and port numbers, or a combination thereof, via a table lookup operation. The version number may be used for updating the list, for example via broadcast device management.

DNS to SC Message

In some embodiments, certain messages may be used to request a particular service class for a data stream without necessarily having to modify the M2M application involved. In some such embodiments, DNS parameters may be used to influence which service class is associated with certain data. In some embodiments, this may be performed via user data rather than by the application itself.

In various embodiments, a table may be stored at the wireless device for mapping DNS request data to service classes. The table may encode DNS hostnames, DNS mapping information, service class identifiers to associate with data streams employing such DNS requests, rules for associating such data streams with particular service classes, and the like.

In some embodiments, the table may be stored in a predetermined list node, and may include at least some of the following entries: a version number, a number of hostname mappings defined in the table, and a hostname mapping list. Each hostname mapping in the list may specify a string length and a string, such as an ASCII encoded string (e.g. "google.com" or "wikipedia.org" or "www.example.com"), along with a service class ID list length, and a list of service class IDs. Thus, service classes may be assigned based on hostnames specified in the packet contents, via a table lookup operation.

Network Access Rules

As mentioned above, network access control may comprise defining network access rules which dictate when and/or how a designated M2M device is to access network resources.

In various embodiments, each network access rule may be implemented as a conditional, e.g. "if then" statement, mapping one or a combination of conditions to an action. The combination of conditions may be a Boolean combination, for example. Conditions may include: time of day (ToD), network congestion level (Cong), and network event limitations (NE).

In some embodiments, actions may include: restricting network access; allowing network access; sending an alert to a portal; resetting the M2M modem; limiting download data rates; limiting upload data rates; and changing the current service class.

In some embodiments, network access rules may further be specific to a service class identifier and/or application data stream identifier.

In some embodiments, network access rules may be updated via broadcast or unicast message from a portal or server.

Service Classes

As discussed elsewhere herein, the service class may specify priority of access to OTA resources in terms of speed and latency. The service class may also specify prioritization, QoS and/or security parameters for use in accessing the OTA resources, or the like. The service class may specify whether end-to-end connection or acknowledgements are required. The service class may specify whether encryption is required. The service class may directly or indirectly specify what level of network resources are to be used, under what network conditions it is permissible to use network resources, or the like. In some embodiments, the service class may include Access Class Barring, temporary stopping of service, time of day service or different speeds at different times. In some embodiments, usage of service classes may be fee-based, for example so that a better class of service can be accessed by paying more for it.

Additional Features

In some embodiments, the device comprises a service for facilitating sending user plane data to the application layer. A higher layer application may be configured to register a call back with the message parser to be called when a predetermined node is written to. This application may then process the written data to determine which application the data should be sent to. The written data contains the name of the application the data is to be sent to. According to embodiments, the intended applications need to register with this service to be able to get data delivered from this service.

In some embodiments, the device comprises a certain higher layer trigger application, which is configured to register a call back with the message parser when it writes new data to another predetermined node. The trigger application may process the data in that node to determine which application e.g. portal to contact. The portal name may be specified in the data. To avoid peaks in network resource usage when plural M2M devices are to access the network after the group trigger is received, the M2M devices may be configured to randomize timing of their initial access to the network. The range of delay may be fixed, controlled by a policy variable, or sent within the trigger message. In some embodiments, the randomization period increases with the number of devices in a group and is specified in the group trigger.

In some embodiments, network event monitoring policies may be specified, for example at each M2M device. Network event monitoring policies may define and control which network events to monitor, how often to transmit monitoring data to a portal, or a combination thereof. Monitoring policies may be group dependent or device dependent.

The technology will now be described with reference to specific examples. It will be understood that the following examples are intended to describe embodiments of the technology and are not intended to limit the technology in any way.

EXAMPLES

Example 1

Figure 8A:
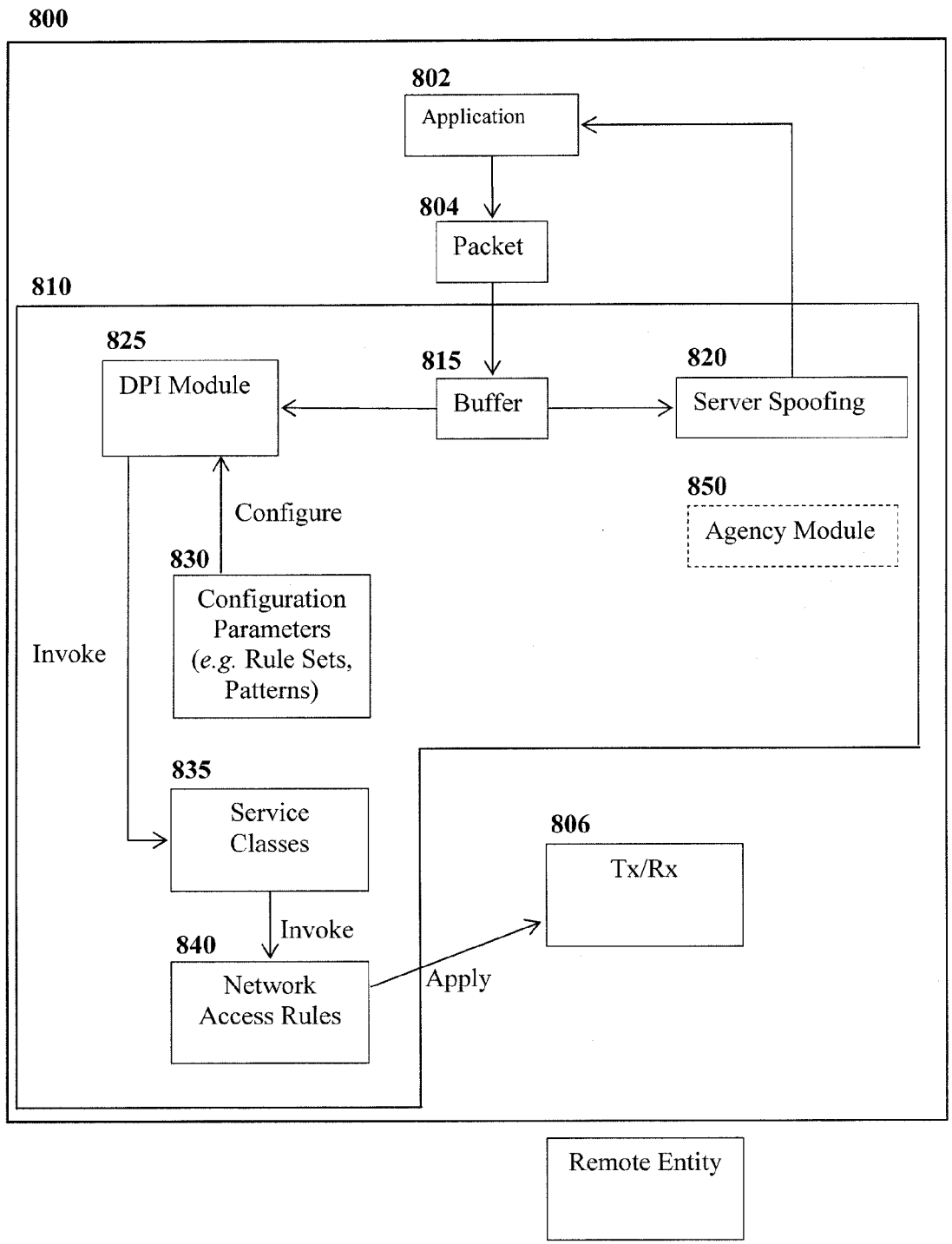
FIGS. 8a to 8c illustrate operations of a network access module provided in accordance with embodiments of the present technology.
Figure 8B:
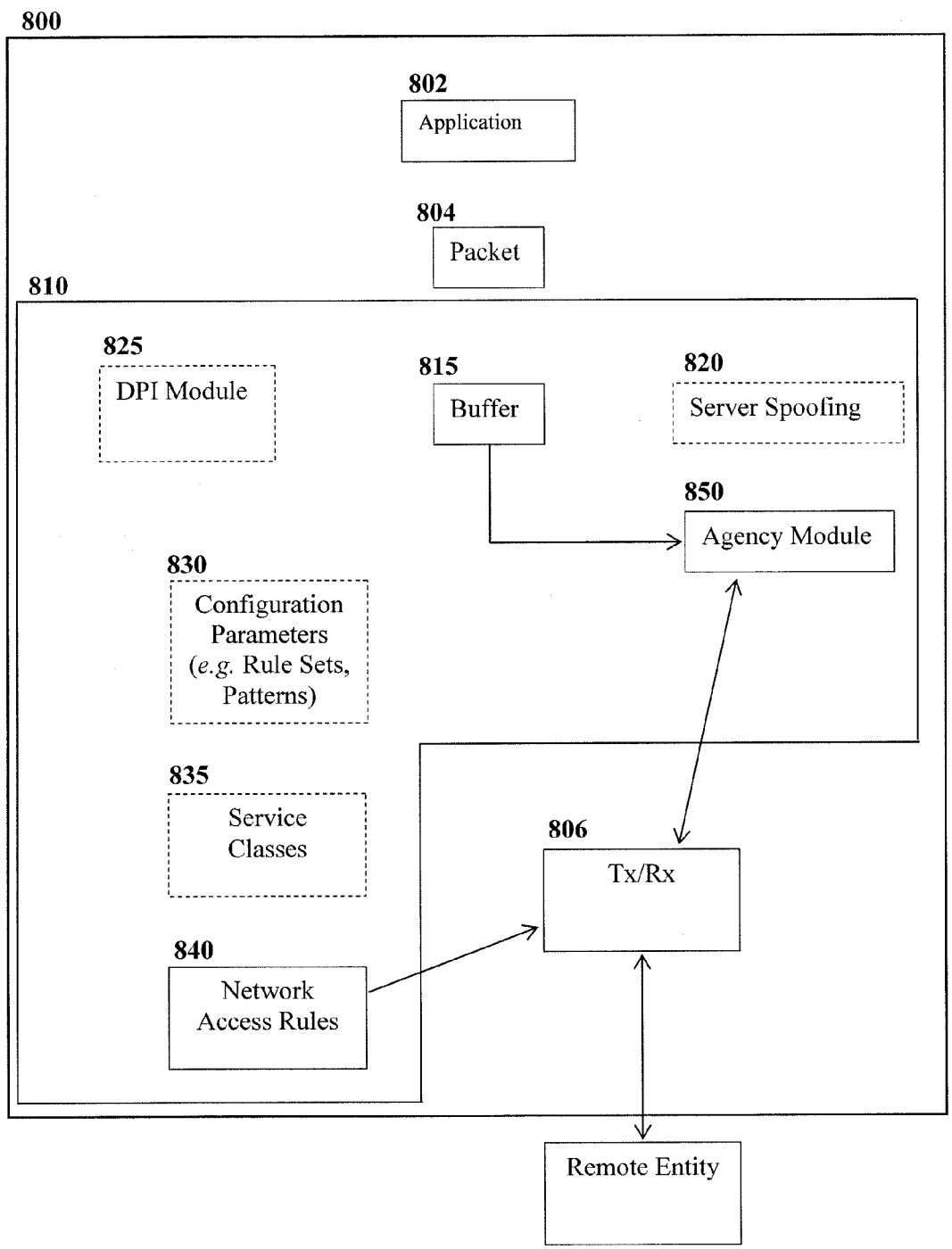
Figure 8C:
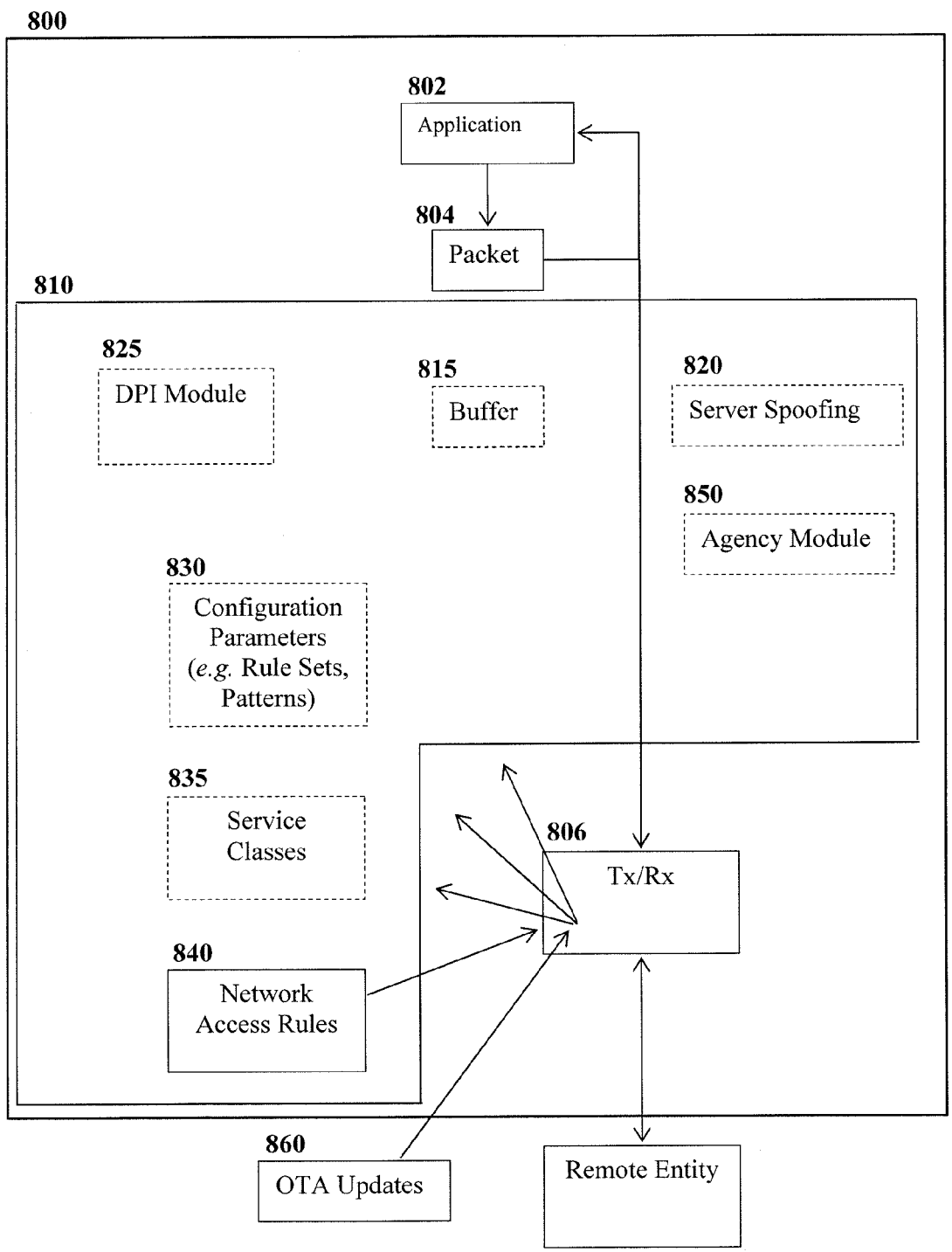

FIGS. 8*a* to 8*c* illustrate operation of a network access module 810 of a wireless device 800 such as a M2M and/or user equipment device forming a remote node in a wireless network, in accordance with an example embodiment of the present invention. The network access module receives data packets from an application 802 running at least partially on the wireless device, and transmits data packets via a wireless transceiver 806 of the wireless device. The application 802 may be one of several applications, and may also operate partially on another device, such as a server which is operatively coupled to the wireless device via wireless communication, for example via a socket-based connection. The wireless transceiver 806 may be configured to communicate with a base station, server, or the like, through an appropriate wireless protocol such as a cellular protocol.

The network access module 810 receives data packets from the application 802 and operates in one of three modes with respect to that application: an initialization mode as illustrated in FIG. 8*a*, a transition mode as illustrated in FIG. 8*b*, and a continuation mode as illustrated in FIG. 8*c*. The network access module may operate in plural modes simultaneously, for example the network access mode may operate in the initialization mode with respect to one application, while also operating in the continuation mode with respect to another application.

With reference to FIG. 8*a*, when the network access module 810 receives one or more packets 804 from an application 802, and the packets and/or application are not currently assigned to a service class, the network access module may operate in the initialization mode as follows. A buffer 815 of the network access module stores the packet or packets 804. If required, a server spoofing module 820 of the network access module reads the contents of the buffer and transmits response packets back to the application 802. It is noted that the server spoofing module may be optional. These response packets are configured to mimic at least some expected responses from the intended remote recipient of the packets 804, for example in order to make it appear to the application that a connection with the recipient has been made, when in fact the packets 804 have not yet been transmitted. Basic handshaking responses may be spoofed by the server spoofing module 820. It is expected that the server spoofing module will have limited capability and will not replace all the functions of the intended packet recipient. However, sufficient responsiveness to appear to establish or maintain a connection, such as a TCP or socket connection, may be provided.

Also during the initialization mode, a Deep Packet Inspection (DPI) module 825 of the network access module operates to read the contents of packets stored in the buffer 815. The DPI module 825 operates in accordance with stored configuration parameters 830, which may include stored rule sets, stored patterns to seek out, and the like. For example, the DPI module may be configured to inspect the buffered packets in order to seek out certain patterns specified by the configuration parameters 830, and to assign a service class based on which (if any) of the stored patterns are found, in accordance with the stored rule sets. The service class may be assigned to the associated application, or to a portion of packets transmitted by the application. The service class may optionally also be assigned to packets received over the air and intended for the application. Once a service class is determined, a service class module 835 is invoked. The service class module associates the assigned service class with one or more network access rules specified in a network access module 840, which is invoked in turn. The network access rules associated with the assigned service class are then applied to certain outgoing and/or incoming packets, for example those packets associated with the application 802. Configuration parameters, service classes and network access rules may be stored in memory such as volatile or non-volatile memory.

In some embodiments, following spoofing of an initial response to the application and possibly also following determining an action and/or service class assignment due to DPI operations, the application may be temporarily inhibited from transmitting further packets for receipt by the buffer. This may be accomplished by transmitting a "buffer full" message from the network access module to the application, for example using an RTS indication. Subsequently, if a connection is to be established then it may be established, and a CTS indication may be transmitted to the application. Subsequently the connection may be allowed and proceed as described below with respect to FIG. 8c. This process may be managed at the TCP protocol layer, for example.

Once the service class is determined, the network access module may enter the transition mode as illustrated in FIG. 8b, if required. The goal of the transition mode is to actualize the connection that was merely spoofed during the initialization mode. An application agency module 850 may operate for this purpose. The agency module 850 may read contents of the buffer 815 and cause packets to be transmitted via the transceiver 806 in order to establish a connection with the intended recipient of packets held in the buffer 815, on behalf of the application. It is noted that the application agency module may be optional. In some embodiments, the agency module 850 may simply cause packets contained in the buffer to be transmitted as necessary, and at the correct times, in order to establish a connection with a remote server, socket, remote application, or the like. If the server spoofing module 820 was previously operative, the buffer may have accurately stored all the packets necessary from the application to establish the connection. If required, the agency module may generate its own packets in order to manage the connection procedure, and/or invoke the application itself to manage the connection procedure. Packets transmitted during the transition mode, for example due to operation of the agency module 850 may be subjected to the network access rules determined during the initialization mode.

Following the transition mode, the network access module may enter the continuation mode as illustrated in FIG. 8c. In this mode, the application may already be associated with a service class, and hence further data packets received from the application are not necessarily buffered or inspected by the DPI module. Rather, the packets may be forwarded directly to the transceiver 806 for transmission, with the network access rules corresponding to the associated service class being applied.

Additionally, as illustrated in FIG. 8c, over-the-air updates 860 may be received by the transceiver 806 for reconfiguration of the network access module 810. These updates are not necessarily received only during the continuation mode, but rather may be received at any time. Updates may be received from a configuration server and may direct adjustment of the configuration parameters 830, such as rule sets or patterns stored therein, service class definitions 835, and network access rule definitions 840. Updates 860 may also be used to adjust behaviour of the server spoofing module 820 and/or the application agency module 850, or other configurable operations of the network access module 810.

Example 2

Figure 4:
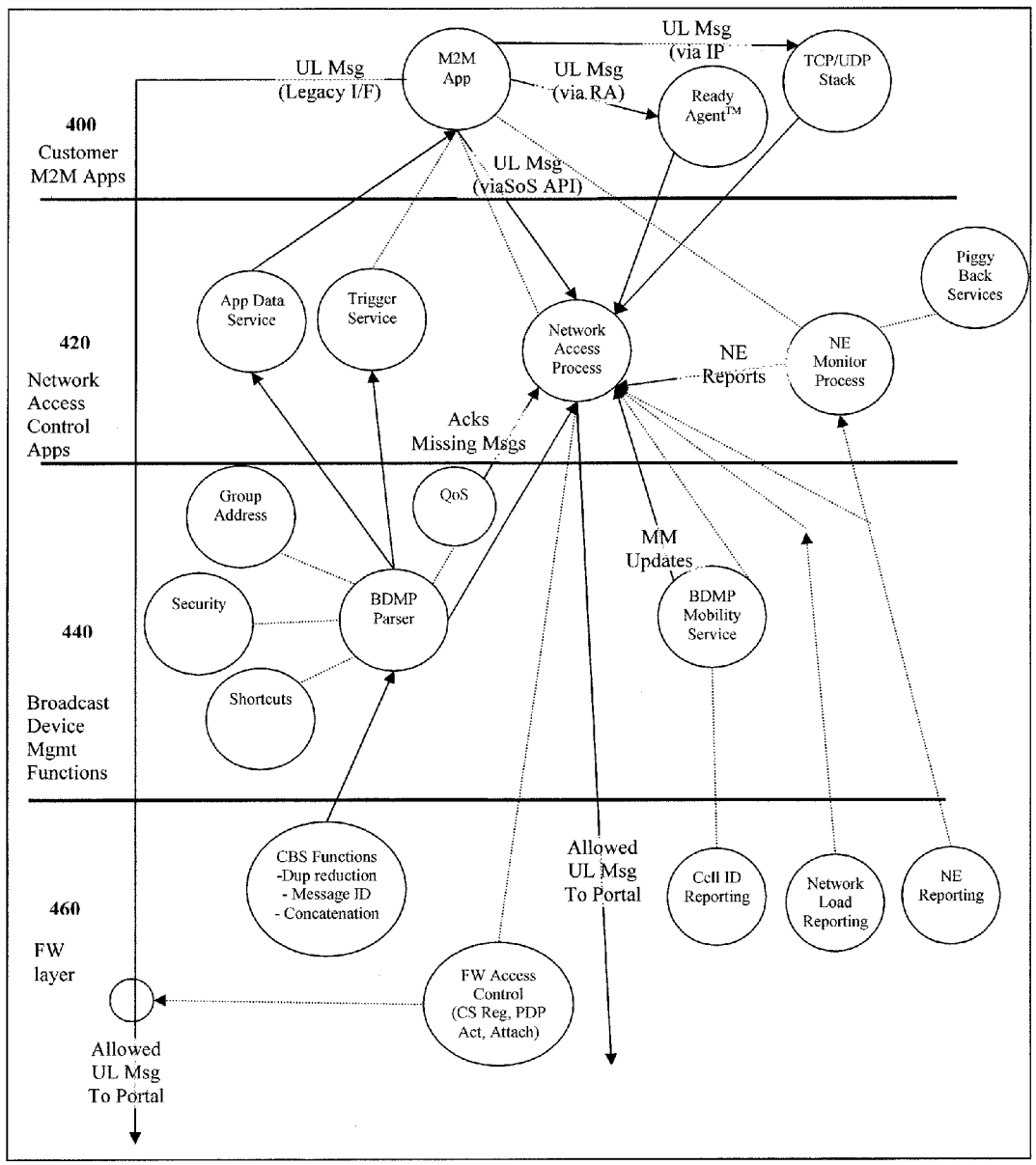
FIG. 4 illustrates the functional architecture of an M2M client device, in accordance with an exemplary embodiment of the present technology.

FIG. 4 illustrates the functional architecture of an M2M client device, in accordance with an exemplary embodiment of the present technology. Four functional layers are illustrated: the M2M application layer 400, the network access control layer 420, the broadcast device management layer 440, and the firmware layer 460. Various functions and their interactions may be facilitated by an appropriate combination of M2M hardware, software and/or firmware. The M2M device may comprise various components such as a processor, volatile and/or non-volatile memory, power supply, radio transceiver, antenna, and the like, which may be configured together to communicate via one or more predetermined protocol sets and to provide the M2M device functionality, as would be readily understood by a worker skilled in the art.

Within the M2M application layer 400, an application may send an uplink message via a legacy interface (thereby bypassing the two intermediate layers 420 and 440). Alternatively, the application may send an uplink message via packet data, such as TCP/IP or UDP IP stack. Alternatively, the application may send an uplink message via AirVantage™ Ready Agent™ (RA), or similar technology. Finally, the application may send an uplink message via a network access control application programming interface (API).

The network access control layer 420 provides various access control services. An application data service and trigger service are provided for passing data from a broadcast device management message parser to the M2M application. A network access process is also provided, for regulating network access in accordance with various network conditions, QoS settings, and the like. The network access control layer further provides for network event monitoring and piggy back services.

The broadcast device management layer 440 provides the broadcast device management message parser and a broadcast device management mobility service. The message parser receives, parses, and forwards received messages, such as SMS-CB messages or other broadcast messages received by the M2M device. Group addresses, security settings, and shortcuts may be accessed and/or modified by the message parser. The message parser may be operatively coupled to the network access process and acknowledgements and retransmission requests may also be generated based on parsed message information. The mobility service may receive information such as cell ID reporting information, and may interface with the network access process to implement mobility management functionality.

The firmware layer 460 is configured to implement cell broadcast service (SMS-CB) functions such as duplicate message reduction, message identification and message concatenation, and to forward selected broadcast messages to higher layers. The firmware layer is also configured to implement firmware-level access control measures, such as allowing or restricting circuit-switched (CS) registrations, PDP activations and/or attachments, and the like. Uplink messages are also passed through the firmware layer to the portal. The firmware layer is further configured to facilitate cell ID reporting, network load reporting, and network event reporting, for example by receiving and processing information from the network and forwarding this information to higher layers.

Figure 5:
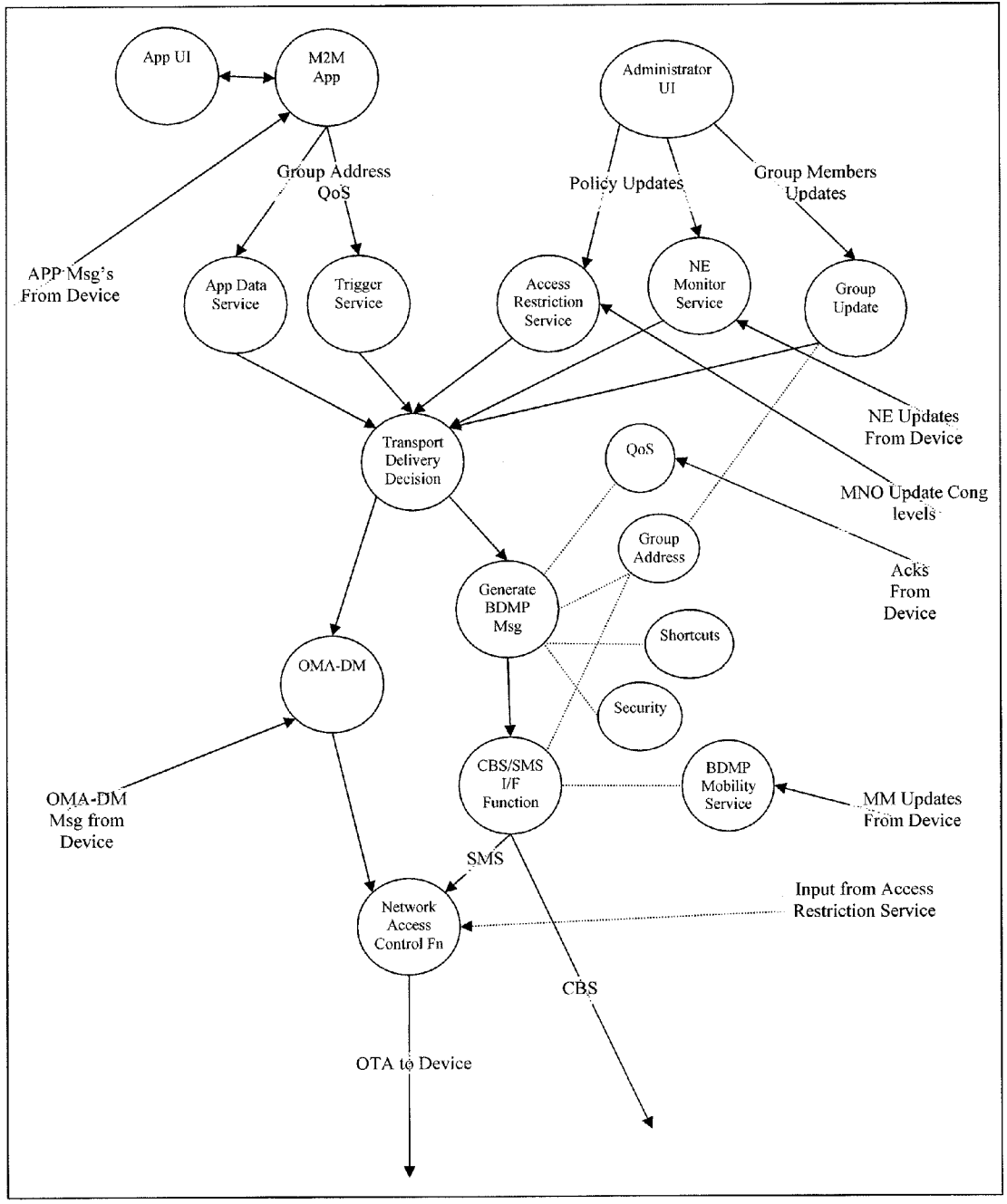
FIG. 5 illustrates the functional architecture of server device, in accordance with an exemplary embodiment of the present technology.

FIG. 5 illustrates the functional architecture of a server or portal device, in accordance with an exemplary embodiment of the present technology. The server or portal may be provided via a computer server, server bank, virtual server, or the like. The server equipment may comprise one or more processors, memory components, and other supporting computing components. The server equipment may be operatively coupled to one or more base stations via a wired or optical communication link and intervening network infrastructure, as would be readily understood by a worker skilled in the art. The base stations may be operated by a mobile network operator, for example. Various server/portal functions and their interactions may be facilitated by an appropriate combination of hardware, software and/or firmware.

The exemplary server device is configured to receive and process the following types of messages regarding client devices: application messages from clients, device management messages such as OMA-DM messages from clients, input from access restriction services, mobility management updates from clients, acknowledgement messages from clients, updates regarding congestion levels from mobile network operators, and network event updates from clients. The above messages may be generated by the clients and passed to the server device via network infrastructure. In some cases the messages may be generated or aggregated by an intermediate network infrastructure device, based on information received from client devices or generated by observing client device activity.

The exemplary server device is configured to generate the following types of messages for forwarding to client devices via wireless communication: unicast messages such as SMS messages, and broadcast messages such as SMS-CB (CBS) messages.

As illustrated, the exemplary server device comprises various functional modules, which will now be briefly described. An application user interface, an M2M server-side application coupled to the application user interface, and an administrator user interface are provided. The M2M server-side application is coupled to an application data service and a device trigger service, and transmits information such as group addresses and QoS information thereto. The administrator user interface is operatively coupled to an access restriction service, network event monitoring service; and a group update service. The administrator user interface may send policy updates and group member updates to these modules. The five services mentioned above are operatively coupled to a transport delivery decision module, which is configured to determine whether to deliver device management messages to clients via OMA-DM or via a broadcast device management message protocol (BDMP). Broadcast device management messages may be generated based at least in part on server functionalities for providing QoS information, group address information, shortcut table information, and security information. An interface function is provided for routing broadcast device management messages via SMS and/or SMS-CB (CBS). SMS messages may be subjected to network access control/restriction functionality.

Figure 6:
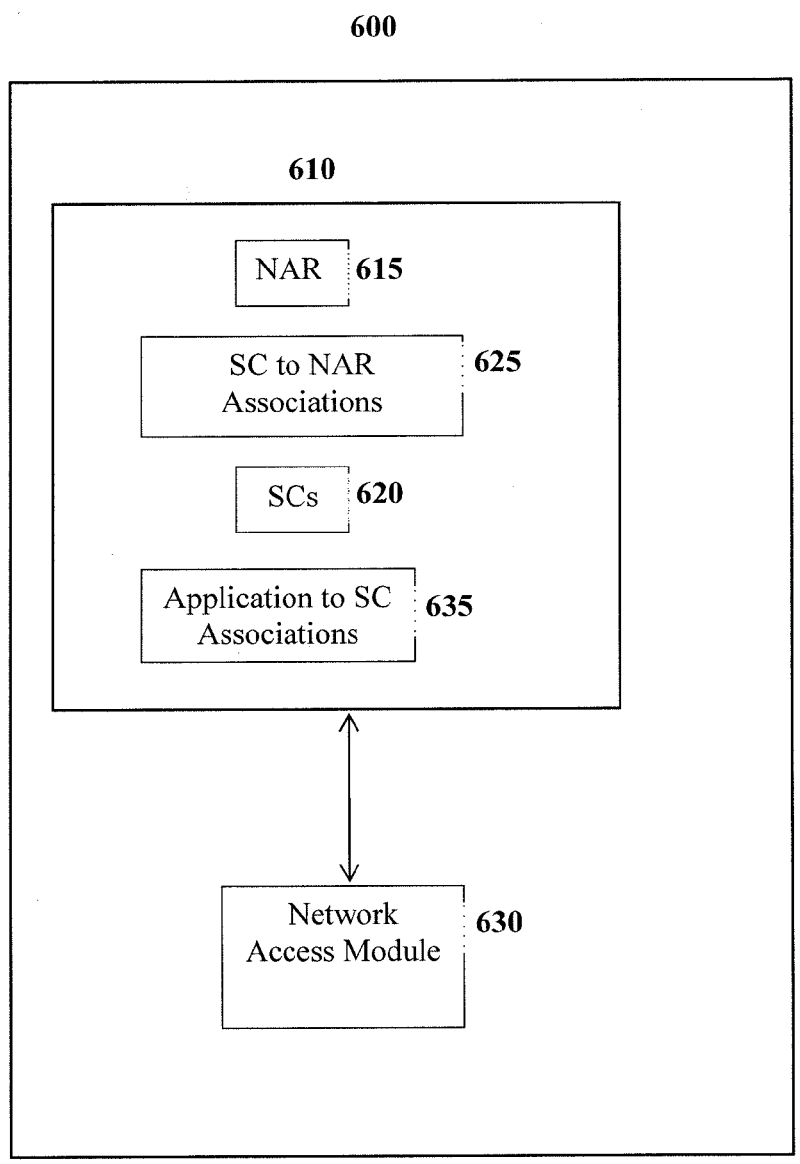
FIG. 6 illustrates a M2M device provided in accordance with embodiments of the present technology.

FIG. 6 illustrates a machine-to-machine (M2M) wireless device 600 provided in accordance with embodiments of the present technology. The M2M device comprises a memory 610, such as a volatile or non-volatile computer memory, which stores thereon a set of network access rules (NARs) 615 and a set of service classes (SCs) 620. The set of network access rules are for potential use in governing network access operations performed by the M2M device. Each service class is associated with a particular subset of the set of network access rules. The associations 625 are also stored in the memory 610. The M2M device further comprises a network access module 630 configured to: receive a request by an application running on the M2M device for accessing the wireless network; determine a service class associated with the application; and access the network in accordance with the determined service class and the subset of network access rules associated with the determined service class. Associations 635 between applications or application data streams, or their identifiers, and service classes are also stored in the memory 610. The network access module 630 may comprise a processor of the M2M device which executes program instructions stored in memory, and accesses a wireless transceiver of the M2M device in order to perform network access operations.

Figure 7:
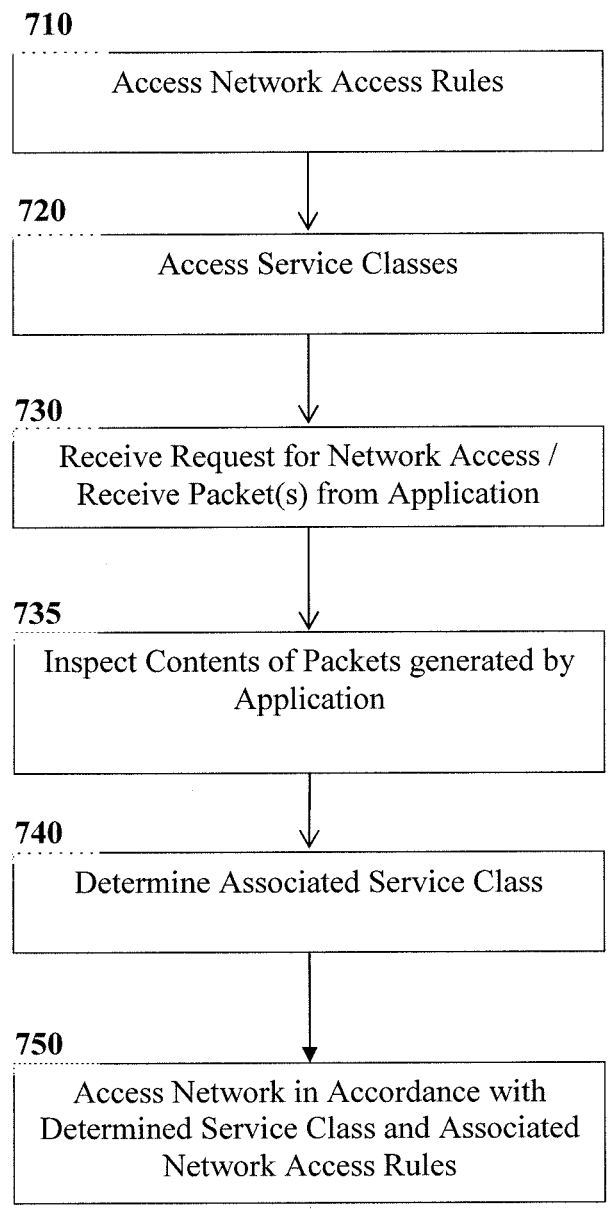
FIG. 7 illustrates a method for managing access to a wireless network by a M2M device, in accordance with embodiments of the present technology.

FIG. 7 illustrates a method for managing access to a wireless network by a machine-to-machine (M2M) wireless device, in accordance with embodiments of the present technology. The method comprises accessing 710 a set of network access rules for potential use in governing network access operations performed by the M2M device. The method further comprises accessing 720 a set of service classes, wherein each service class is associated with a particular subset of the set of network access rules. Such associations may also be defined as part of the service class definition. The method further comprises receiving 730 a request by an application running on the M2M device for accessing the wireless network. The request may be explicit or implicit. For example the request may be represented by communication of one or more packets from the application to a network access module which is responsible for mediating access with the wireless network. The method further comprises inspecting 735 contents of packets generated by the application. The method further comprises, upon receipt of said request, determining 740 a service class associated with the application based on the packet contents and in accordance with a rule set, and accessing 750 the network in accordance with the determined service class and the subset of network access rules associated with the determined service class. In some embodiments, accessing the network access rules and service classes may comprise defining same, for example as instructed by a remote server which updates network access rules and/or service class definitions via broadcast or unicast device management messages. In some embodiments, the network access rules and service classes are stored in memory and accessed by accessing the memory.

The set of service classes may include one or both of a default service class and an override service class. Determining the service class may comprises selecting the default service class when an association between the application and a particular one of the set of service classes is otherwise unspecified. Alternatively, if a service class is not explicitly specified, a service class may be assigned by inspecting the data packets generated by the application and applying a predetermined rule set to determine a service class based on data packet contents. Further, accessing the network may be additionally performed in accordance with the subset of network access rules associated with the override service class. For example, the override service class may apply in addition to other invoked service classes. Conflicts between network access rules when two or more service classes apply may be resolved in various ways, for example by accessing the network in a manner such that all network access rules are respected as much as possible, and ignoring conflicting network access rules of lower priority if necessary.

In various embodiments, at least one of said network access rules defines or is associated with a random back-off time parameter. In various embodiments, at least one of said network access rules defines or is associated with a maximum wait time parameter.

It will be appreciated that, although specific embodiments have been described herein for purposes of illustration, various modifications may be made without departing from the spirit and scope of the invention. In particular, it is within the scope of the invention to provide a computer program product or program element, or a program storage or memory device such as a transmission medium, magnetic or optical wire, tape or disc, or the like, for storing signals readable by a machine, for controlling the operation of a computer according to the method of the invention and/or to structure its components in accordance with the system of the invention.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for managing access to a wireless network by a wireless device, the method comprising:
   a. accessing a set of network access rules for potential use in governing network access operations performed by the wireless device;
   b. accessing a set of service classes, wherein each service class is associated with a particular subset of the set of network access rules;
   c. upon receiving a request by an application running on the wireless device for accessing the wireless network, determining a service class associated with the application, and accessing the network in accordance with the determined service class and the subset of network access rules associated with the determined service class;
   wherein determining the service class comprises inspecting data packets transmitted by the application and allocating the service class based on contents of said data packets in accordance with a rule set; and
   wherein allocating the service class based on contents of said data packets comprises allocating the service class based on payload contents of said data packets or a transport-layer criterion specified in the data packets or a link-layer criterion specified in the data packets or an application layer criterion specified in the data packets or a communication protocol used in the data packets.

2. The method according to claim 1, wherein the transport-layer criterion is a USSD message, MO SMS bearer, SMS destination number, IP PDN connection identifier, destination IP address, or destination port number.

3. The method according to claim 1, further comprising remotely configuring the rule set via transmission of a configuration message to the wireless device, wherein the configuration message is transmitted via a broadcast channel or a unicast channel.

4. A method for managing access to a wireless network by a wireless device, the method comprising:
   a. accessing a set of network access rules for potential use in governing network access operations performed by the wireless device;
   b. accessing a set of service classes, wherein each service class is associated with a particular subset of the set of network access rules;
   c. upon receiving a request by an application running on the wireless device for accessing the wireless network, determining a service class associated with the application, and accessing the network in accordance with the determined service class and the subset of network access rules associated with the determined service class; and
   d. buffering at least some of the data packets within the wireless device, and refraining from transmitting said at least some of the data packets prior to determining the service class;
   wherein determining the service class comprises inspecting data packets transmitted by the application and allocating the service class based on contents of said data packets in accordance with a rule set.

5. The method according to claim 4, further comprising communicating one or more response packets to the application in response to receipt of the data packets, said response packets generated within the wireless device and communicated internally within the wireless device prior to determining the service class.

6. The method according to claim 4, further comprising, following determining the service class, communicating with an intended recipient of the data packets on behalf of the M2M device based on contents of the buffered data packets.

7. The method according to claim 4, wherein the buffered data packets are indicative of one or both of connect operations and send call operations.

8. The method according to claim 4, further comprising inhibiting the application from further generation of packets for a period prior to determining the service class.

9. The method according to claim 4, further comprising buffering at least some of the data packets within the wireless device and detecting an end of communication of said at least some data packets by detecting a pause in communication of said at least some data packets by the application, by detecting a port read operation performed by the application following communication of said at least some data packets, or both.

10. A method for managing access to a wireless network by a wireless device, the method comprising:
    a. accessing a set of network access rules for potential use in governing network access operations performed by the wireless device;
    b. accessing a set of service classes, wherein each service class is associated with a particular subset of the set of network access rules;
    c. upon receiving a request by an application running on the wireless device for accessing the wireless network, determining a service class associated with the application, and accessing the network in accordance with the determined service class and the subset of network access rules associated with the determined service class; and
    d. blocking at least some DNS queries, generated by the application, from being wirelessly transmitted;
    wherein determining the service class comprises inspecting data packets transmitted by the application and allocating the service class based on contents of said data packets in accordance with a rule set.

11. A wireless device comprising:
    a. a memory comprising a set of network access rules for potential use in governing network access operations performed by the M2M wireless device, and a set of service classes, wherein each service class is associated with a particular subset of the set of network access rules;
    b. a network access module configured to: receive a request by an application running on the M2M wireless device for accessing the wireless network; determine a service class associated with the application; and access the network in accordance with the determined service class and the subset of network access rules associated with the determined service class, wherein determining the service class comprises inspecting data packets transmitted by the application and allocating the service class based on contents of said data packets in accordance with a rule set;

wherein allocating the service class based on contents of said data packets comprises allocating the service class based on payload contents of said data packets or a transport-layer criterion specified in the data packets or a link-layer specified in the data packets or an application layer criterion specified in the data packets or a communication protocol used in the data packets.

12. The wireless device according to claim 11, wherein the rule set is stored by the network access module and is remotely configurable via transmission of a configuration message to the wireless device, wherein the configuration message is transmitted via a broadcast channel or a unicast channel.

13. A wireless device comprising:
  a. a memory comprising a set of network access rules for potential use in governing network access operations performed by the M2M wireless device, and a set of service classes, wherein each service class is associated with a particular subset of the set of network access rules;
  b. a network access module configured to: receive a request by an application running on the M2M wireless device for accessing the wireless network; determine a service class associated with the application; and access the network in accordance with the determined service class and the subset of network access rules associated with the determined service class, wherein determining the service class comprises inspecting data packets transmitted by the application and allocating the service class based on contents of said data packets in accordance with a rule set;
  wherein the network access module comprises a buffering module configured to buffer at least some of the data packets within the wireless device, and wherein the network access module is configured to refrain from transmitting said at least some of the data packets prior to determining the service class.

14. The wireless device according to claim 13, wherein the network access module comprises a server spoofing module configured to communicate one or more response packets to the application in response to receipt of the data packets, said response packets generated within the wireless device and communicated internally within the wireless device prior to determining the service class.

15. The wireless device according to claim 13, further comprising an application agency module configured, following determining the service class, to communicate with an intended recipient of the data packets on behalf of the M2M device based on contents of the buffered data packets.

16. The wireless device according to claim 13, wherein the buffering module is further configured to inhibit the application from further generation of packets for a period prior to determining the service class.

17. The wireless device according to claim 13, further comprising a buffering module configured to buffer at least some of the data packets within the wireless device and to detect an end of communication of said at least some data packets by detecting a pause in communication of said at least some data packets by the application, by detecting a port read operation performed by the application following communication of said at least some data packets, or both.

18. A non-transitory computer program product configured for managing access to a wireless network by a wireless device, the computer program product comprising code which, when loaded into memory and executed on an associated processor, is adapted to perform:
  a. accessing a set of network access rules for potential use in governing network access operations performed by the wireless device;
  b. accessing a set of service classes, wherein each service class is associated with a particular subset of the set of network access rules;
  c. upon receiving a request by an application running on the wireless device for accessing the wireless network, determining a service class associated with the application, and accessing the network in accordance with the determined service class and the subset of network access rules associated with the determined service class,
  wherein determining the service class comprises inspecting data packets transmitted by the application and allocating the service class based on contents of said data packets in accordance with a rule set;
  wherein allocating the service class based on contents of said data packets comprises allocating the service class based on payload contents of said data packets or a transport-layer criterion specified in the data packets or a link-layer criterion specified in the data packets or an application layer criterion specified in the data packets or a communication protocol used in the data packets.

* * * * *